(12) United States Patent
Yamanaka et al.

(10) Patent No.: US 7,066,513 B2
(45) Date of Patent: Jun. 27, 2006

(54) OPERATION METHOD OF NANOTWEEZERS

(75) Inventors: Shigenobu Yamanaka, Osaka (JP); Akio Harada, Osaka (JP); Yoshikazu Nakayama, Hirakata (JP)

(73) Assignees: Daiken Chemical Co., Ltd., Osaka (JP); Yoshikazu Nakayama, Osaka (JP)

( * ) Notice: Subject to any disclaimer, the term of this patent is extended or adjusted under 35 U.S.C. 154(b) by 114 days.

(21) Appl. No.: 10/364,990

(22) Filed: Feb. 12, 2003

(65) Prior Publication Data
US 2003/0151267 A1    Aug. 14, 2003

(30) Foreign Application Priority Data
Feb. 12, 2002   (JP) .............................. 2002-034354

(51) Int. Cl.
*B25J 7/00* (2006.01)
(52) U.S. Cl. ...................... 294/99.1; 294/86.4; 901/46; 977/DIG. 1
(58) Field of Classification Search ................. 294/1.1, 294/86.4, 99.1, 907; 901/30, 31, 36, 39, 901/46, 47; 29/720, 729, 740; 977/DIG. 1
See application file for complete search history.

(56) References Cited
U.S. PATENT DOCUMENTS

| | | | | |
|---|---|---|---|---|
| 4,343,993 A | * | 8/1982 | Binnig et al. | 250/306 |
| 5,126,574 A | * | 6/1992 | Gallagher | 250/492.2 |
| 5,365,073 A | * | 11/1994 | White | 250/492.3 |
| 5,854,487 A | * | 12/1998 | Braunstein et al. | 250/306 |
| 6,191,598 B1 | * | 2/2001 | Hollman | 324/758 |
| 6,508,979 B1 | * | 1/2003 | Requicha et al. | 419/7 |
| 6,516,528 B1 | * | 2/2003 | Choo et al. | 33/552 |

OTHER PUBLICATIONS

"Nanotube Nanotweezers", Science magazine (vol. 286, pp. 2148-2150), Dec. 10, 1999.*

* cited by examiner

*Primary Examiner*—Dean J. Kramer
(74) *Attorney, Agent, or Firm*—Koda & Androlia

(57) ABSTRACT

The operation method of nanotweezers including the steps of: confirming the position of a nanoscale material by way of imaging the surface of a specimen by a scanning type probe microscope; moving the nanotweezers to the position over the nanoscale material; descending the nanotweezers which are in an opened state and then closing the nanotweezers so as to hold the nanoscale material; raising the nanotweezers that hold the nanoscale material and then moving the nanotweezers to an objective position; and descending the nanotweezers that hold the nanoscale material and then opening the nanotweezers, thus releasing the nanoscale material on the objective position which is on the surface of the specimen and is where a nanoscale construction is constructed.

4 Claims, 8 Drawing Sheets

OPERATION METHOD OF NANOTWEEZERS

BACKGROUND OF THE INVENTION

1. Field of the Invention

The present invention relates to nanotweezers that hold and release a nanoscale material by way of closing and opening the tip end portions of nanotubes of which the base end portions are fastened to a holder and more particularly to an operation method of nanotweezers wherein the nanotweezers hold a nonoscale raw material on a specimen surface and release the nanoscale material after being moved to an objective position.

2. Prior Art

Nanotweezers that use nanotubes were first disclosed in the 'Science' magazine in 1999 (P. Kim, and C. M. Lieber, Science, Vol. 286 (1999) p. 2148). The nanotweezers were constructed by fastening two carbon nanotubes to two electrodes fixed at the tip end of a glass tube, and the nanotubes are controlled so as to be opened and closed by static electricity.

The article of the 'Science' magazine describes, along with photo pictures, two nanotubes that are opened and closed by way of applying a direct voltage of 0 to 8.5 volt between the electrodes. The photo pictures show the nanotweezers picking up a nanocluster of a nanoscale polystyrene or SiC from a sample source.

Furthermore, the article describes that a scanning tunnel microscope (STM) or a scanning type probe microscope (SPM) such as an atomic force microscope (AFM) can be used in order to handle micro-materials and observe the physical properties of such micro-materials.

However, holding nanoscale materials with two nanotubes and taking them out from a group of raw materials cannot accomplish the object of nano-technology that constructs a nanoscale construction. Such object is only accomplished by a process that moves nanoscale materials to an objective position and construct a nanoscale construction by way of putting the nanoscale materials at the objective position.

The article referred to above does not describe at all concerning how to combine AFM apparatuses and nanotweezers and how to relate coincidentally both of them. Thus, the relationship between AFM apparatuses and nanotweezers are quite obscure. Unless a combination of AFM apparatuses and nanotweezers and a systematic operation method of nanotweezers with the use of AFM apparatuses are established, the practical use of nanotweezers cannot be developed.

SUMMARY OF THE INVENTION

Accordingly, it is an object of the present invention to provide a concrete and improved operation method of nanotweezers.

It is another object of the present invention to provide an operation method of nanotweezers that, by way of making it clear how two or more nanotubes that make the nanotweezers are operated, carries the nanoscale materials to an objective position and then releases the nanoscale materials at the objective position so as to compose a nanoscale construction with such nanoscale materials.

The above object is accomplished by unique steps of the present invention for an operation method of nanotweezers that are comprised of two or more nanotubes which are fastened at base end portions thereof to a holder and hold and release a nanoscale material by way of opening and closing tip end portions thereof; and in the present invention, the method comprises the steps of:

confirming the position of the nanoscale material (used for constructing a nanoscale construction) by way of imaging the surface of a specimen by a scanning type probe microscope;

moving the nanotweezers to a position over the nanoscale material;

descending the nanotweezers which are in an opened state and then closing the nanotweezers so as to hold the nanoscale material;

raising the nanotweezers that hold the nanoscale material and then moving the nanotweezers to an objective position; and descending the nanotweezers that hold the nanoscale material and then opening the nanotweezers so as to release the nanoscale material on the objective position which is on the surface of the specimen.

In the above method of the present invention, after releasing the nanoscale material on the surface of the specimen, confirmation of whether or not the nanoscale material exists at the objective position is made by the scanning type probe microscope.

The above object is accomplished by further unique steps of the present invention for an operation method of nanotweezers that are comprised of two or more nanotubes which are fastened at base end portions thereof to a holder and hold and release a nanoscale material by way of opening and closing tip end portions thereof; and in the present invention, the method comprises the steps of:

moving the nanotweezers to a position over the nanoscale material (used for constructing a nanoscale construction);

descending the nanotweezers which are in an opened state and then closing the nanotweezers so as to hold the nanoscale material;

raising the nanotweezers that hold the nanoscale material and moving the nanotweezers to an objective position; and descending the nanotweezers that hold the nanoscale material and then opening the nanotweezers so as to release the nanoscale material on the objective position which is on the surface of the specimen; and during the operations of the nanotweezers, the entirety of the specific region of the surface of the specimen is being observed by a microscope.

In the above method of the present invention, when the nanotweezers are opened so as to release the nanoscale material on the specimen surface, a voltage is applied between the nanotweezers and the specimen, thus allowing the nanotweezers to release the nanoscale easily.

Furthermore, in the present invention, the above-described operation methods of the nanotweezers are saved in a memory of a computer, and the nanotweezers are controlled by the computer according to the procedure of the operation method.

DETAILED DESCRIPTION OF THE INVENTION

The operation method of nanotweezers according to the present invention will be described below in detail with reference to the accompanying drawings.

Figure 1:
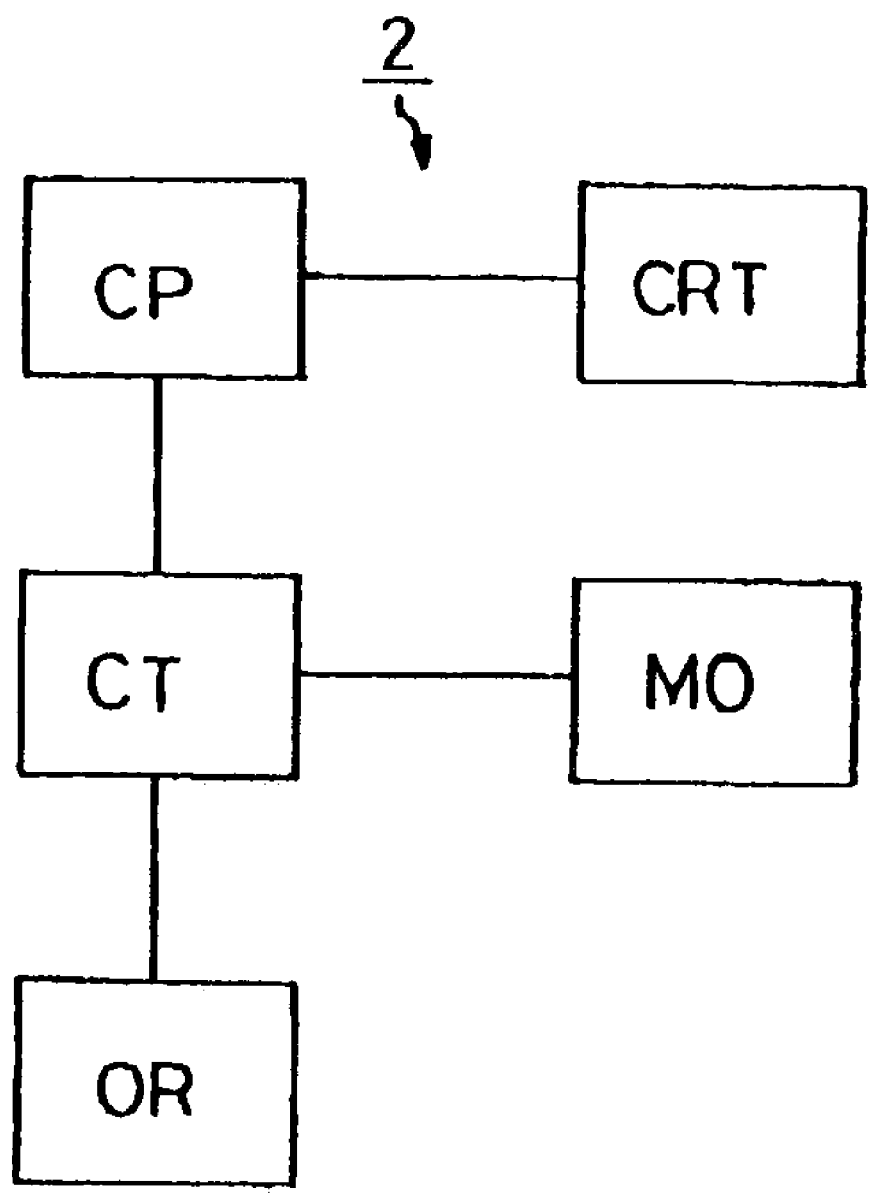
FIG. 1 is a block diagram of a nanotweezers device according to the present invention.

FIG. 1 is a block diagram of the nanotweezers apparatus of the present invention. The nanotweezers apparatus 2 is controlled by a computer CP which has operation procedure. The operation procedure proceeds by imputing necessary parameters into the computer CP, and each step of the operation procedure is shown on a display CRT.

A controller CT acts according to the command from the computer CP and sends output signals to operation equipment installed in an operation room OR. The controller CT also takes in the signals from the operation equipment of the operation room OR and displays an enlarged image of a specimen surface on a monitor MO according to the output signals and the input signals.

Figure 2:
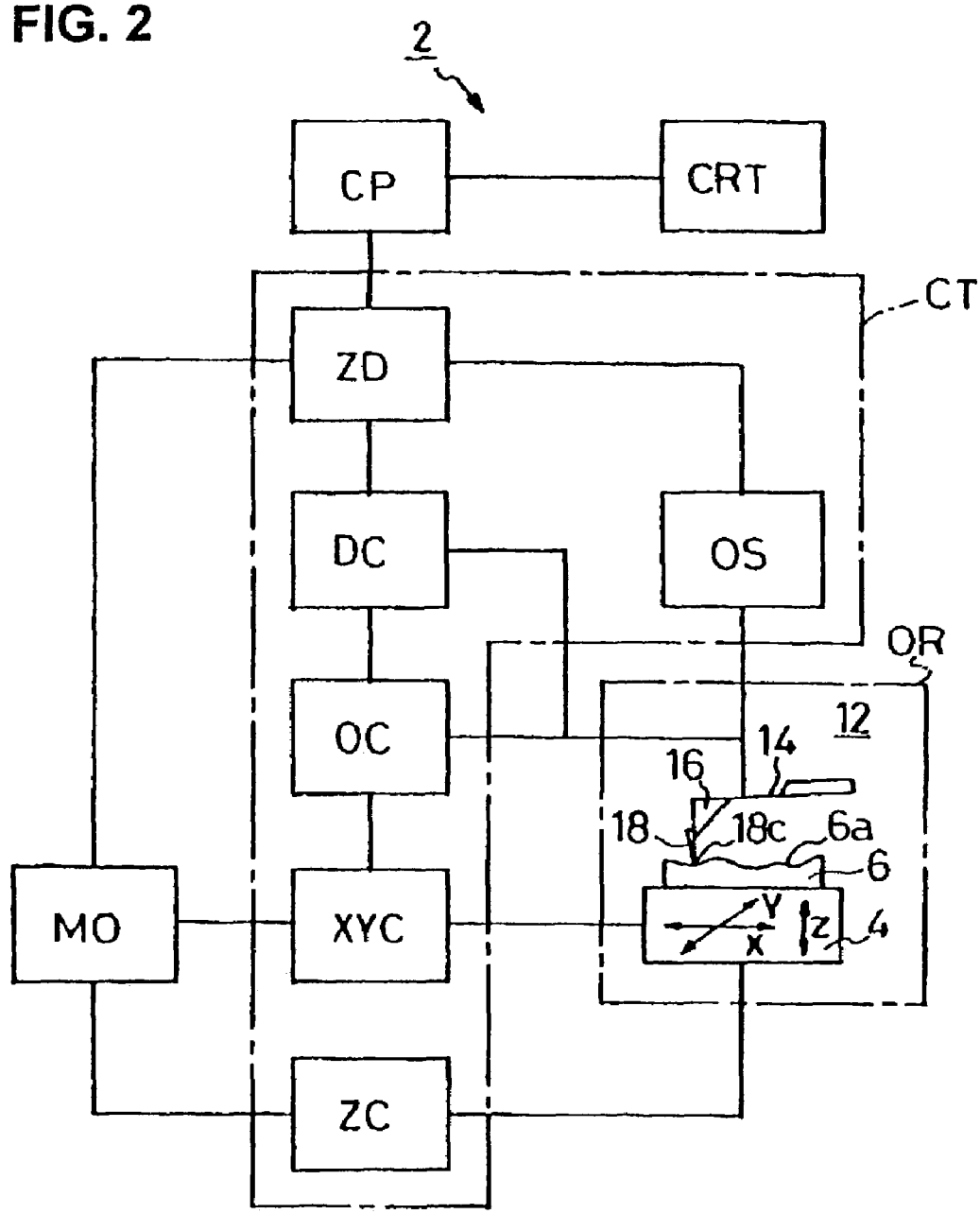
FIG. 2 is a block diagram of the operation of the nanotweezers device of the present invention, FIG. 2 showing the detail of the diagram of FIG. 1.

FIG. 2 shows a detailed block diagram of the nanotweezers device of FIG. 1. In FIG. 2, the computer CP, the display CRT and the monitor MO are the same as those in FIG. 1.

The controller CT includes a Z-control section ZC, an XY-control section XYC, an opening-closing control section OC, a discharge control section DC, a Z-detection section ZD, and an oscillator control section OS. In the operation room OR, a specimen 6 is disposed on a sample stand 4, and the nanotweezers 12 are set on the specimen 6.

The nanotweezers 12 utilize a cantilever of an ATM and are constructed by way of fastening two nanotubes 18 to a tip end portion 16 that is at the tip end of the cantilever 14. The tip end 18c of the nanotube 18 can serve as a probe needlepoint that scans the surface 6a of the specimen 6, and an enlarged image of the specimen surface 6a is displayed on the monitor MO. The nanotweezers 12 are structured so as to hold a nanoscale material between the two nanotubes 18.

The Z control section ZC adjusts the position of a Z direction of the tip end 18c of the nanotube 18, that is, the position of height, by minutely moving the sample stand 4 in the Z direction. The XY control section XYC controls so as to move the sample stand 4 in the XY direction, so that a specific part of the sample surface 6a is scanned by the nanotube tip 18c. In the shown embodiment, the nanotweezers 12 are fixed positionally, and the sample stand 4 is moved. Conversely, the nanotweezers 12 can be caused to move in the XYZ direction with the sample stand 4 fixed positionally. In any event the sample stand 4 and the nanotweezers 12 are provided so as to be moved relatively.

The opening-closing control section OC controls the opening and closing of the tip ends of the two nanotubes 18. There are various methods in the opening-closing control method for nanotubes; and in the shown embodiment, a method that utilizes electrostatic attractive force is adopted. In this method that utilizes the electrostatic attractive force, when a direct current voltage is applied between the nanotubes 18, the tip ends of the nanotubes close due to the electrostatic attractive force between the positive and negative charges accumulated in the neighborhood of the tip ends of the nanotubes 18; and when the static electricity is canceled by making the voltage off, the tip ends of the nanotubes open due to the restorative force of the nanotubes.

The release control section DC actively releases a nanoscale material 8 which will be described below. The nanoscale material might stick to the tip end of the nanotube 18 with molecular force or electric force and not fall on the specimen surface 6a, even if the tip ends of the nanotubes are opened.

In such a case, by way of applying a voltage between the nanotube 18 and the specimen 6, the nanoscale material 8 can be forcibly released on the specimen surface 6a due to the electric field force. Whether the specimen 6 is made to be a positive electric pole or a negative electric pole is determined by the adhesion condition of the nanoscale material 8. In other words, when the nanoscale material adheres with electric force or only with molecular force without loading charge, the nanoscale material 8 can be released by way of making the polarity turn over or by way of adjusting the applied voltage by the release control section DC.

An AFM apparatus is used as the operation room OR, and any one of the contact mode and the non-contact mode can be used in the shown embodiment. A non-contact mode is employed in this embodiment, so that the tip end 18c of the nanotube 18 is disposed in the region of the attractive force of the specimen surface 6a and is in the non-contact mode with the specimen surface 6a.

A proper frequency of the nanotweezers 12 changes when the height of the tip end 18c of nanotube from the specimen surface 6a is changed while making the nanotweezers 12 in proper oscillation state by the oscillator control section OS. The height of the nanotweezers 12 from the specimen surface 6a is measured by detecting the amount of change of the proper frequency.

The figure (surface figure) of the unevenness (projection-indentation) on the specimen surface 6a is observed in the following manner.

For instance, the sample stand 4 is minutely moved in the Z direction while scanning the sample stand 4 in the X direction so as to keep the proper frequency fixed at a constant value. Since the sample stand 4 is raised and lowered so that the interval (height) of the nanotube tip end 18c from the unevenness surface of the specimen surface 6a is kept constant, the changes in this Z coordinate show an image of the unevenness surface. An image of the specimen surface in the XY region is obtained by successively indicating the changes in the Z coordinate for the X coordinate with changing a Y coordinate.

Though not shown, a contact mode can be employed to observe the specimen surface. In the contact mode, the nanotube tip end 18c is caused to approach the repulsive force region of the specimen surface. When the tip end 18c has approached the repulsive force region, this state is generally called that the tip end 18c is in contact with a specimen surface; and thus this state is called a "contact mode."

When the sample stand 4 is moved in the XY direction in the contact mode, the tip end 18c moves upward and downward in accordance with the unevenness on the specimen surface 6a, so that the amount of deflection of the cantilever 14 changes. When a laser beam is irradiated in the rear surface of the cantilever 14, the reflection beam fluctuates in accordance with the amount of deflection of the cantilever, and the amount of unevenness of the specimen surface 6a is detected from the amount of the fluctuation.

If a piezoelectric film is coated in the top surface of the cantilever 14, the piezoelectric film is transformed in response to the amount of deflection of the cantilever 14, so that the variation of the deflection, i.e., the amount of unevenness on the specimen surface 6a is detected by measuring the electric output of the piezoelectric film. In this way, the image of the specimen surface is obtained even by the contact mode. The non-contact mode or the contact mode is properly employed in accordance with the situation. The specimen surface figure is displayed on the monitor MO.

Figure 3:
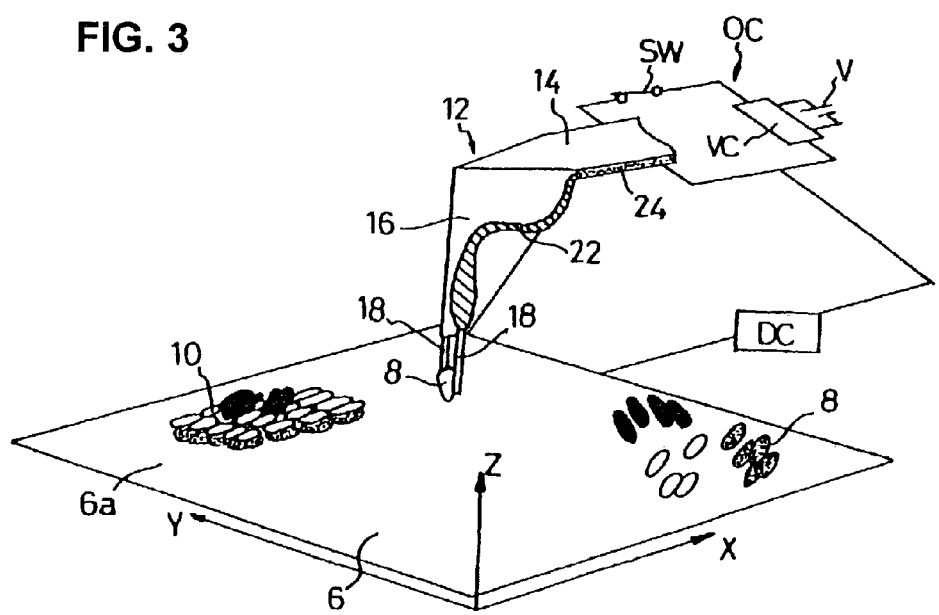
FIG. 3 shows the manner of the arrangement of nanotweezers and a specimen surface.

FIG. 3 illustrates the arrangement of the nanotweezers and specimen surface. XYZ axes are set for the specimen 6 as shown in FIG. 3. The nanoscale material 8 is on the specimen surface 6a, and the nanoscale material 8 is held between the nanotubes 18 of the nanotweezers 12 and carried to the position of the nanoscale construction 10. The nanoscale construction 10 can be, for instance, a nano-circuit, a molecular construction, a micro-organ of a living body, a cell, a DNA gene, a virus, an extremely small material, a polymer and other micro-material. The specimen 6 is not limited to be a plane material, and it can be an unevenness material; and it can be any processing object such as physical and chemical materials or organic substances like living body materials.

The nanotubes 18 are connected by lead lines 22 to electrodes 24 which are disposed on the cantilever 14. The opening-closing control section OC is connected with the electrodes 24.

The opening-closing control section OC includes a switch SW, a voltage control circuit VC and a power supply V. The voltage applied between the electrodes 24 can be controlled by the voltage control circuit VC, and the opening and closing of the nanotubes 18 are controlled by the on-off operation of the switch SW.

When the switch SW is turned on, a direct voltage is applied between the nanotubes 18. When as a result positive and negative electricity are stored at the tip ends of the nanotubes 18, the space between the tip ends 18c of the nanotubes is closed due to the electrostatic force between the positive electricity and the negative electricity. When the switch SW is turned off, the electrostatic force disappears, and the space between the tip ends 18c of the nanotubes 18 is opened.

It may happen that when the switch SW is turned off, the positive and negative electricity stored in the tip ends 18c of the nanotubes 18 are not released so that the nanotubes remain in charged state or so that the nanoscale material 8 continues to adhere to the nanotube 18 even the space between the nanotubes are opened.

When this happens, then the discharge control section DC is acted. The discharge control section DC applies a voltage between the specimen 6 and the nanotweezers 12, by which the height of the voltage and the electric polarity of plus or minus is controlled.

The nanoscale material 8 is forcibly released on the specimen surface 6a by means of the operation of the discharge control section DC.

Figure 4:
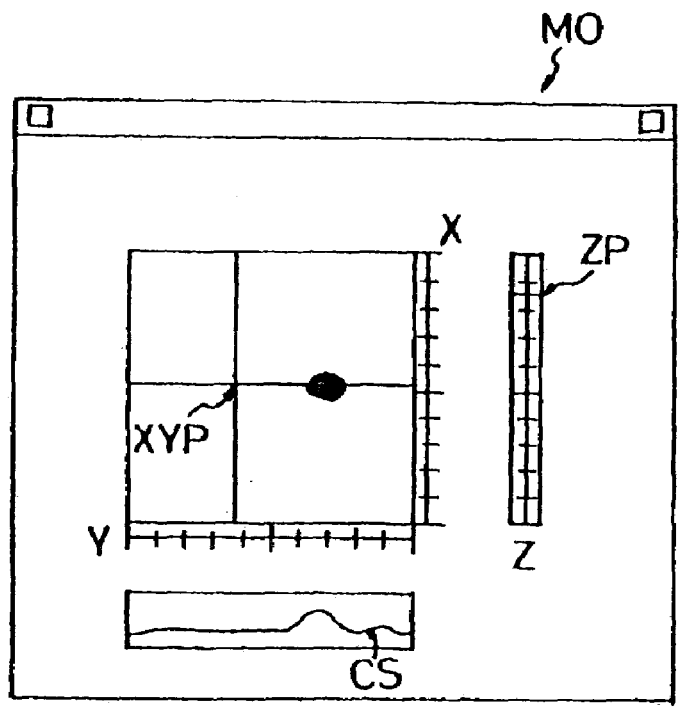
FIG. 4 shows an image of a monitor the displays a specimen surface.

FIG. 4 shows the image of the monitor that displays the figure of a specimen surface. A specific region of the specimen surface 6a is shown in the XY display section, and a X coordinate axis and a Y coordinate axis are disposed together with scale marks. The coordinates (X, Y) pointed by an XY cursor XYP shows the position of the tip end 18c of the nanotube.

A cross section CS indicates the section along the X cursor or the Y cursor, and an accurate figure of the unevenness of the cross-section of a specimen surface is displayed. The Z axis gives the direction perpendicular to an XY plane, and the tip end 18c of the nanotube exists at the position pointed by the Z cursor ZP. Therefore, it follows that the tip end 18c of the nanotube exists at the position of the space coordinates (X, Y, Z) pointed by the cursor.

Figure 5:
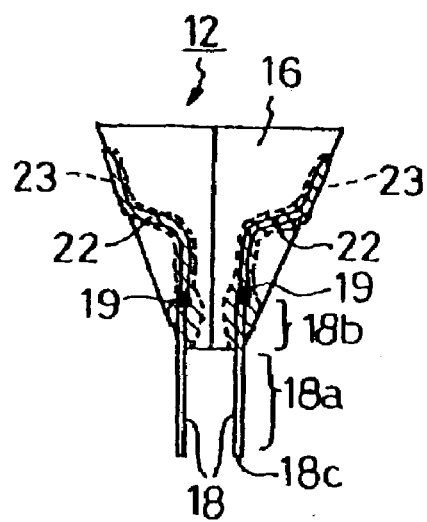
FIG. 5 is a front view of the nanotweezers in an opened state.

FIG. 5 shows the front of the nanotweezers in an open state. The base end portions 18b of the nanotubes 18 are fastened to the surface of the protruding portion 16 by the fusion-welded portion 19 and in addition fastened more strongly with a coating film 23. Of course, the fusion-welded portion 19 is not necessarily needed.

The tip end portions 18a of the nanotubes 18 are disposed in parallel downward in a protruding fashion from the protruding portion 16. The lead lines 22 which use nanotubes are connected to the nanotube base end portions 18b, and the surfaces of the lead lines 22 are fastened to the protruding portion 16 by a coating film 23. When a direct current voltage is not applied to the nanotubes, an electrostatic force does not act, and thus the tip ends 18c are opened.

Figure 6:
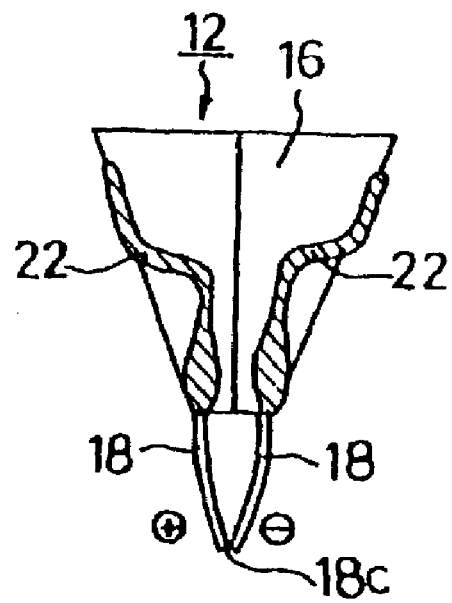
FIG. 6 is a front view of the nanotweezers in a closed mode.

FIG. 6 shows the front of the nanotweezers which are closed. When a direct current voltage is applied to the nanotubes 18, the positive and negative electricity is stored at the nanotube tip ends 18c, and the space between the tip ends 18c is closed by the electrostatic attractive force.

In the case that the nanotube 18 is a conductive nanotube such as a carbon nanotube, the surface of the nanotube can be covered by an insulation covering film. With this insulation covering film, an electric short can be avoided, even if the tip ends 18c contact with each other. In order to prevent the electric short-circuit, it is enough to cover at least the areas near the tip ends 18c of the nanotubes 18 that contact with each other with the insulation film.

In nanotweezers that have two nanotubes 18 can be utilized as a probe needle point for AFM by closing the tip ends 18c and making the tip ends one point. The same can be applied for nanotweezers that are formed by three and more nanotubes. In such nanotweezers, the tip ends can be used as a single probe needle point for AFM by way of closing such tip ends.

When the length of the nanotubes 18 is different from each other, then the tip end 18c of the longest nanotube can be used as an AFM probe needle point; and in this case, there is no need to close the tip ends. In other words, the tip end 18c of the longest nanotube 18 works as a probe needle point for AFM with the tip ends opened.

Figure 7:
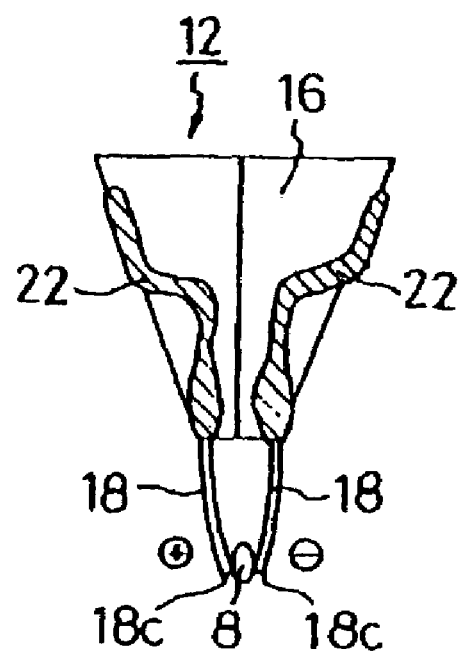
FIG. 7 is a front view of the nanotweezers which are holding a nanoscale material.

FIG. 7 shows the front of nanotweezers which are holding a nanoscale material. The nanotweezers 12, with which nanotubes 18 being in an open-state, are caused to vertically descend, so that a nanoscale material 8 is located between the nanotubes 18. Then, the nanotubes 18 are closed, and the nanoscale material 8 is held between the tip ends 18c.

Figure 8:
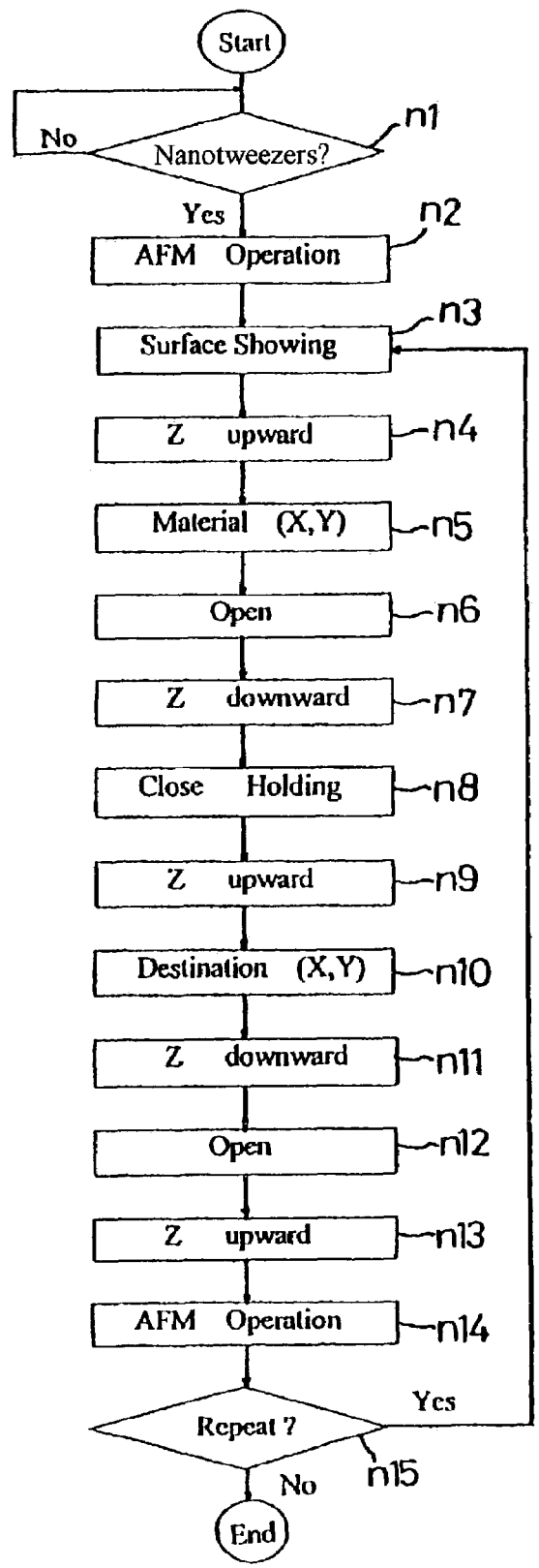
FIG. 8 is a first flow chart which shows the operation method of nanotweezers.

FIG. 8 is a first flow chart that shows the operation method of nanotweezers. The program which carries out the first flow chart is memorized in the memory of the computer CP. By way of operating the various devices shown in FIG. 2, steps n1 through n15 are executed according to this program.

First, when the operation (n1) of nanotweezers is chosen in the step n1, AFM scanning of the specified region on the specimen surface 6a is carried out (n2), and the image of the specimen surface is displayed on the monitor MO (n3). The position where the nanoscale material 8 (which are for the nano-structures) are set and the objective position to which the nanoscale material 8 is carried are displayed in this image of the specimen surface.

After the position of the nanoscale material 8 is confirmed, the nanotweezers 12 are caused to move up to the position Z (n4) and then caused to move to the place (X, Y) where the nanoscale material 8 exists (n5). The nanotube tip ends 18c are caused to open at the position (n6) and caused to descend, keeping the open-state, to the position of the specimen surface 6a (n7).

Since the nanoscale material 8 is between the nanotube tip ends 18c, the nanoscale material 8 can be held only by closing the tip ends 18c (n8). The nanotweezers 12 that hold the nanoscale material is caused to move up to the position Z (n9) and caused to move to the objective coordinate (X, Y) (n10) where a nanoscale construction 10 is set.

When the nanotweezers are moved to the objective coordinate, the nanotube tip ends 18c are caused to descend to the surface of the nanoscale construction 10 (n11), and the nanotube tip ends 18c are opened. By this opening operation (n12), the nanoscale material 8 is released on the objective position of the nanoscale construction 10. After that, the nanotweezers 12 are caused to move up to the position Z (n13). Then, the operation that moves the nanotweezers 12 is halt.

Next, in order to confirm whether the nanoscale material 8 is disposed in the objective position of the nanoscale construction 10 as planed, the nanotweezers 12 are used as a probe needle for AFM. In other words, an AFM scanning is made for the region of the nanoscale construction 10 by way of using the nanotweezers 12 (n14), thus confirming whether the position or the arrangement of the nanoscale material 8 is right.

After the arrangement of the nanoscale material 8 is confirmed, it is asked whether the nanotweezers operation is repeated or not (n15). If the answer is "yes", then the process returns back to the step n3, and the carriage of another nanoscale material 8 is performed. In this way, by way of repeating the nanotweezers operation for several times, the nanoscale construction 10 is built.

In step n12, if the nanoscale material 8 does not fall on the specimen surface 6a, and it is found that the nanoscale material 8 sticks to the nanotube 18, then the discharge control section DC is operated so as to put the nanoscale material 8 on the specimen surface 6a. This discharge control operation is not shown in the flow chart of FIG. 8.

FIGS. 9A through 9D show the movements of the nanotweezers according to the designed flow chart.

Figure 9A:
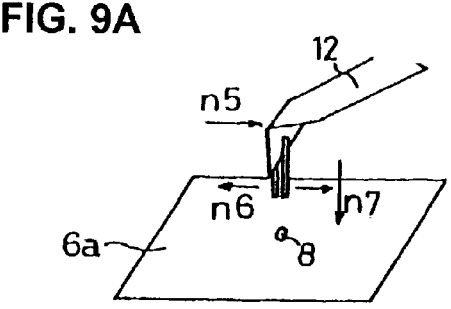
FIGS. 9A through 9D show the operation method of nanotweezers according to the flow chart.
Figure 9B:
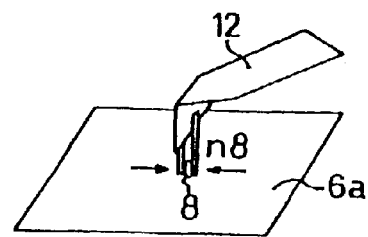

In FIG. 9A, the nanotweezers 12 are caused to move to the position of the nanoscale material 8 in steps n5, n6 and n7; and in FIG. 9B, the nanotweezers 12 are closed (step n8) so that the nanoscale material 8 is held.

Figure 9C:
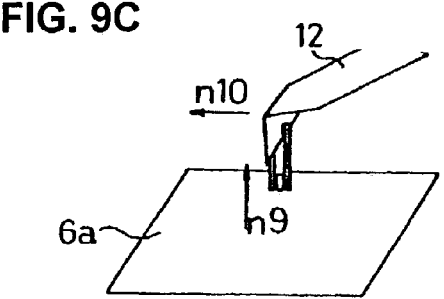
Figure 9D:
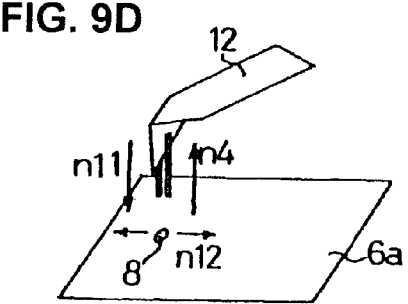

In FIG. 9C, the nanoscale material 8 is carried to the position of the nano-construction 10 in steps n9 and n10; and in FIG. 9D, the nanoscale material 8 is released on the objective position (steps n11 and n12). After that, the nanotweezers 12 are caused to move up (step n4) and returned to the initial state.

The operation method of the nanotweezers 12 shown in FIG. 9 is characterized in that the entire condition of the specimen surface 6a are confirmed by AFM scanning and the situation in which the nanoscale material 8 is released is confirmed by AFM scanning. However, the AFM scanning takes rather a long time, and the nanotweezers operation takes many steps.

Figure 10:
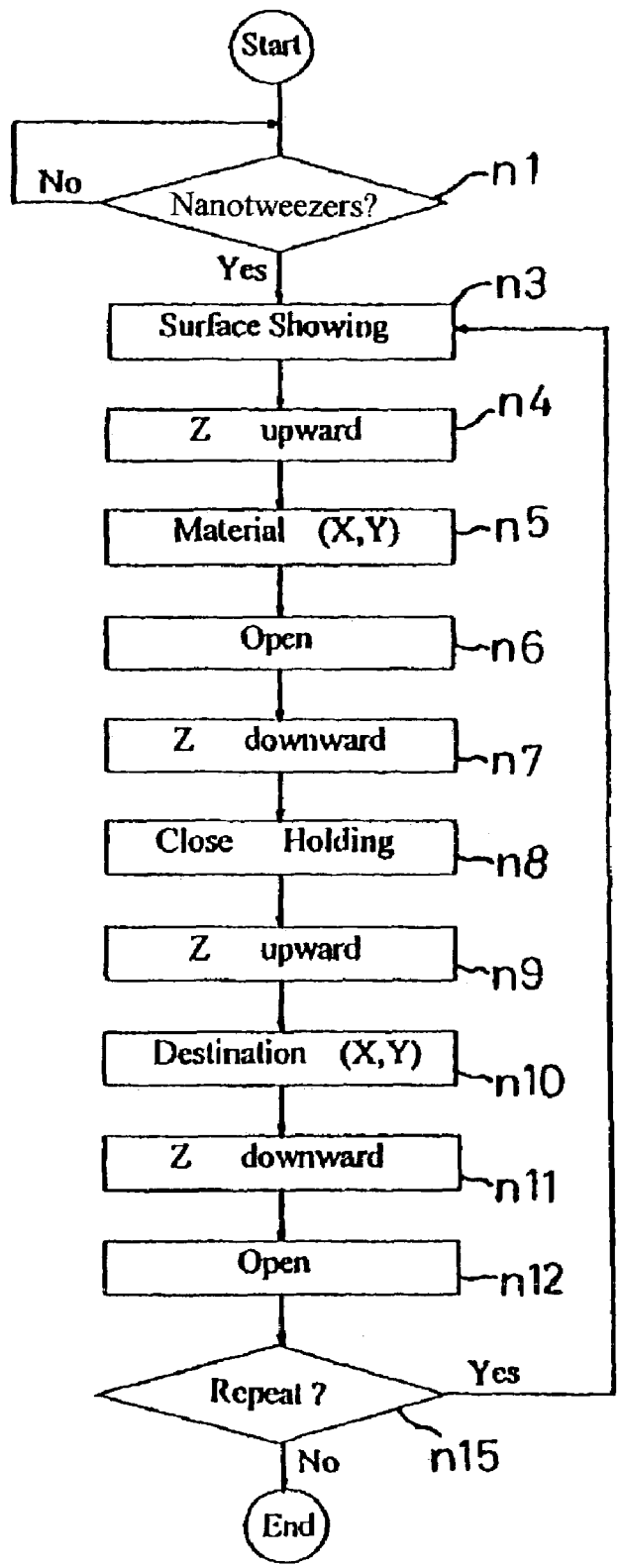
FIG. 10 is a second flow chart which shows the operation method of nanotweezers.

FIG. 10 shows the second flow chart of the operation method of the nanotweezers. The feature of the flow chart of FIG. 10 is in that the situation of the specimen surface is observed in the same time in real time without doing the AFM operation. In other words, the nanotweezers are operated with the enlarged image of the specimen surface being displayed by way of using an optical microscope or an electron microscope.

In an optical microscope, there is a limit in a magnification and a brightness of enlarged images of the specimen surface. To the contrary, an electron microscope is more appropriate for the magnification and the degree of brightness of enlarged image. But, the optical microscope is advantageous since the electron microscope needs vacuum technique. Needless to say, an ion microscope and other image expansion apparatus can be used.

Accordingly, in the process of FIG. 10, steps n2, n13 and n14 in which AFM scanning is executed are not executed. However, the method of FIG. 10 has advantages in that the nanotweezers operation is carried out efficiently, since the nanotweezers are manipulated while the specimen surface is being imaged constantly (n3) for its entirety.

All the steps shown in FIG. 10 correspond to the steps of FIG. 8 and also to the steps in FIG. 9. Since the same steps in each Figure have the same operation effect, the explanation is omitted.

The present invention is not limited to the embodiments described above. Various modifications and design alternations, etc. that involve no departure from the technical concept of the present invention are also included in the technical scope of the present invention.

As seen from the above, according to the present invention, a nonoscale material is carried assuredly from its initial position to an objective position and then released there while confirming the initial position and the objective position of the nanoscale material by scanning the specimen surface by the scanning type probe microscope. Thus, the carriage of the nanoscale material and the building of a nanoscale construction can be precisely and securely carried out.

Also, a nanoscale construction is obtained assuredly in accordance with an intended plan, since it can be confirmed whether a nanoscale material exists in the objective position by using the scanning type probe microscope after the nanoscale material is released on the specimen surface.

Furthermore, according to the present invention, the entirety of the specified region of the specimen surface is constantly imaged by the microscope while the nanotweezers are manipulated. Accordingly, scanning of the probe microscope done each time is made unnecessary, and the carriage control of the nanoscale material and the building of a nanoscale construction can be speeded up, and the operation time is shortened.

Also, when the nanotweezers are opened and a nanoscale material is released on the specimen surface, the release operation of the nanoscale material is made easily by way of applying a voltage between the nanotweezers and the specimen. Thus, the building speed of a nano construction is increased.

Further, according to the present invention, since the operation method of the nanotweezers is memorized in the memory of a computer, and the nanotweezers are controlled by the computer in accordance with the stored operation process. Thus, an automatic operation of nanotweezers is realized.

The invention claimed is:

1. An operation method of nanotweezers that are comprised of two or more nanotubes which are fastened at base end portions thereof to a holder and hold and release a nanoscale material by way of opening and closing tip end portions thereof, said method comprising the steps of:
   confirming a position of said nanoscale material by way of imaging a surface of a specimen by a scanning type probe microscope;
   moving said nanotweezers to a position over said nanoscale material;
   descending said nanotweezers which are in an opened state and then closing said nanotweezers so as to hold said nanoscale material;
   raising said nanotweezers that hold said nanoscale material and then moving said nanotweezers to an objective position; and
   descending said nanotweezers that hold said nanoscale material and then opening said nanotweezers so as to release said nanoscale material on said objective position which is on said surface of said specimen; wherein
   a voltage is applied between said nanotweezers and said specimen when said nanotweezers are opened so as to release said nanoscale material.

2. The operation method of nanotweezers according to claim 1, wherein after releasing said nanoscale material on said surface of said specimen, whether said nanoscale material is at said objective position is confirmed by said scanning type probe microscope.

3. An operation method of nanotweezers that are comprised of two or more nanotubes which are fastened at base end portions thereof to a holder and hold and release a nanoscale material by way of opening and closing tip end portions thereof, wherein said method comprises the steps of:
   moving said nanotweezers to a position over said nanoscale material;
   descending said nanotweezers which are in an opened state and then closing said nanotweezers so as to hold said nanoscale material;
   raising said nanotweezers that hold said nanoscale material and then moving said nanotweezers to an objective position; and
   descending said nanotweezers that hold said nanoscale material and then opening said nanotweezers so as to release said nanoscale material on said objective position which is on said surface of said specimen; and wherein
   during operations of said nanotweezers, an entirety of a specific region of said surface of said specimen is kept in an imaging condition by a microscope, and a voltage is applied between said nanotweezers and said specimen when said nanotweezers are opened so as to release said nanoscale material.

4. An operation method of nanotweezers, wherein said operation method of said nanotweezers according to claim 1, 2 or 3 is stored in a memory of a computer, and said nanotweezers are controlled by said computer according to a procedure of said operation method.

* * * * *